United States Patent
Chatterjee et al.

(10) Patent No.: US 6,421,715 B1
(45) Date of Patent: *Jul. 16, 2002

(54) SYSTEM AND METHOD FOR GENERATING AND TRANSMITTING A COMMAND IN RESPONSE TO A REQUEST FOR ADDITIONAL DATA AND DATA DESCRIBED IN THE REQUEST

(75) Inventors: Debashish Chatterjee; Lakshminarayanan "Luxi"Chidambaran, both of Fremont; Mohammad S Lari, Palo Alto, all of CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,385

(22) Filed: Jun. 11, 1997

(51) Int. Cl.⁷ .............................................. G06F 15/16
(52) U.S. Cl. .................. 709/219; 709/216; 709/217
(58) Field of Search .................. 395/200.01, 200.33, 395/609; 707/6, 1, 2; 370/232; 709/234, 219, 216, 217; 711/113, 137

(56) References Cited

U.S. PATENT DOCUMENTS

| | | | | |
|---|---|---|---|---|
| 5,632,015 A | * | 5/1997 | Zimowski et al. | 395/200.01 |
| 5,754,771 A | * | 5/1998 | Epperson et al. | 395/200.33 |
| 5,787,461 A | * | 7/1998 | Stephens | 711/113 |
| 5,797,001 A | * | 8/1998 | Augenbraun et al. | 395/609 |
| 5,802,569 A | * | 9/1998 | Genduso et al. | 711/137 |
| 5,812,527 A | * | 9/1998 | Kline et al. | 370/232 |
| 5,819,268 A | * | 10/1998 | Hackett | 707/6 |
| 5,822,749 A | * | 10/1998 | Agarwal | 707/2 |
| 5,832,231 A | * | 11/1998 | Raman et al. | 709/234 |
| 5,835,904 A | * | 11/1998 | Vicik et al. | 707/1 |

* cited by examiner

Primary Examiner—Le Hien Luu
(74) Attorney, Agent, or Firm—Innovation Partners; Charles E. Gotlieb

(57) ABSTRACT

A method and apparatus allows a client or other device separate from a server to retrieve from the server more data than is requested by an application program on the client. The additional data is maintained by the client or other device and provided to the application program in response to a subsequent request, reducing the number of times data is requested from the server, and also the processing and overhead required by the server to supply the data. If the server releases memory pointing to the data on the server at the time or after all data specified by the application program has been retrieved, because the data is potentially retrieved from the server in amounts larger than requested by the application program, the server may release memory pointing to the data on the server sooner than it would by processing requests for the data from the application program alone.

25 Claims, 6 Drawing Sheets

|  | FIRST (212) | LAST (214) | SEX (216) | DEPT. (218) |
|---|---|---|---|---|
| 220 → | MARY | SMITH | F | ENGINEERING |
| 222 → | JOHN | JONES | M | ENGINEERING |
| 224 → | JERRY | JACOBS | M | ENGINEERING |
| 226 → | ANN | CRANSTON | F | ENGINEERING |
| 228 → | JIM | BROWN | M | ENGINEERING |
| 230 → | KIM | AARON | F | ENGINEERING |

SYSTEM AND METHOD FOR GENERATING AND TRANSMITTING A COMMAND IN RESPONSE TO A REQUEST FOR ADDITIONAL DATA AND DATA DESCRIBED IN THE REQUEST

RELATED APPLICATIONS

The subject matter of this application is related to the subject matter of application Ser. No. 08/872,529, U.S. Pat. No. 6,243,751, entitled, "Method and Apparatus for Coupling Clients to Servers" filed on June 11 by Debashish Chatterjee, John Bellemore and Amit Jasuja, and to the subject matter of application Ser. No. 08/873,644 now pending, entitled, "Method and Apparatus for Reducing Inefficiencies Caused by Sending Multiple Commands to a Server" filed on Jun. 11, 1997 by Debashish Chatterjee and Luxi Chidambaran, and to the subject matter of application Ser. No. 08/873,057, U.S. Pat. No. 6,088,728, entitled, "Method and Apparatus for Switching Client Sessions in a Server" filed on Jun. 11, 1997 by John Bellemore, Debashish Chatterjee and Amit Jasuja, each having the same assignee as this application and each is incorporated herein by reference in its entirety.

FIELD OF THE INVENTION

The present invention relates to computer software, and more specifically to client-server computer software.

BACKGROUND OF THE INVENTION

Where a single repository of data is shared by many users, a client-server architecture may be adopted. Referring now to FIG. 1, four computers 110, 112, 114, 116 arranged using a client-server architecture are illustrated. In a client-server architecture, a server 110 is used to access a data repository storage device 102 that stores the data that is shared among the clients 112, 114, 116. Clients 112, 114, 116 can request the data from the server 110, process data, provide data to the server 110 and change data stored in the storage device 102 attached to the server 110. Users of the client-server system 100 use a client 112, 114, 116 to communicate with the server 110 to access the shared data stored in the storage device 102. Clients 112, 114, 116 do not have direct access to the data in the storage device 102, but may request that the server 110 perform actions such as performing queries, or adding to or changing the data stored in the storage device 102.

Each client 112, 114, 116 is coupled to the server 110 by a connection 122, 124, 126 between the clients 112, 114, 116 and the server 110. Each connection 122, 124, 126 may be physically separate as shown in FIG. 1, or may be shared using a local area network, or LAN. Ports 142, 144, 146 in each of the clients 112, 114, 116 and associated cabling provide the OSI layers 1–2 connectivity between the ports 132, 134, 136 of the server 110. If the server 110 will communicate with each client 112, 114, 116 over a LAN, a single LAN interface port may physically replace ports 132, 134, 136, and ports 132, 134, 136 are treated as logical ports.

As the user of each client 112, 114, 116 performs work, the client 112, 114, 116 will send commands to the server 110, and some of the commands will cause the server 110 to send data to the requesting client 112, 114, 116. Each command that is sent to the server 110 requires resources from the server 110 to process the command. Commands that request data not only require the server 110 to process the command, but also to obtain the data from the data storage 102 and transmit it to the requesting client.

A conventional client 112, 114, 116 obtains data from the server using a request, such as a conventional query execute command. A conventional query execute command describes the data to be retrieved using a user command such as the following command, which selects the first, last, sex and department fields from an employee table for all employees having a department field equal to "ENGINEERING":

select emp_first, emp_last, emp_sex, emp_dept from_employee where emp_dept='ENGINEERING'     (Query 1)

The client 112, 114 or 116 formats the query execute command to include the select command above in a format required by the server and passes it to the server 110 in the form of a query execute command. The server executes the query and sets up pointers to the results in a storage area of the server 110 such as memory or hard disk. In the conventional Oracle 7 product, this area is known as an evaluation tree, and the evaluation tree is pointed to by a cursor, described below. The use of an evaluation tree and a cursor allow the query result to be rapidly retrieved from the storage device 102 a portion of the table at a time.

The data pointed to by the cursor is logically arranged as a table, with data related to each of the records described by the query corresponding to a row, and each of the fields described by the query corresponding to a column. Referring now to FIG. 2, sample results of the execute command including the select statement shown in Query 1 above are shown in table 210, with columns 212, 214, 216, 218 corresponding to the first and last names, sex and department, respectively, and rows 220–230 corresponding to individual records described by the query. The data in table 210 need not be physically arranged as shown, but may be referred to and transmitted logically as shown.

Referring now to FIGS. 1 and 2, commands sent from the client 112, 114, 116 to the server 110 direct the server 110 to transmit to the client 112, 114 or 116 some or all of the table result 210 pointed to by the cursor. Using the query execute command, the client 112, 114, 116 can direct the server 110 to not only execute the query, but also to provide a portion of the results to the requesting client 112, 114, or 116. Additional portions of the result are requested by the client 112, 114 or 116 using a "fetch" command, which causes the server 110 to fetch a specified amount of data from the storage device 102 and transmit it to the requesting client 112, 114, 116.

Using this execute-fetch approach, the client 112, 114, 116 can develop the query, have it executed by the server 110, yet accept only a desired amount of the results of the query at a time. If the initial portion of the results of the query are not sufficient to the user of the client 112, 114, 116, the user may not wish to see the remainder of the query results, saving transmission to the client 112, 114, 116 of the remainder of the unwanted result. Alternatively, if the user wishes to see or process additional data from the query result, the client 112, 114, 116 can request it using one or more subsequent fetch commands, with each fetch command retrieving a specified number of rows 220–230 of the table 210.

The ability to receive only a portion of the table result saves the server 110 the overhead of passing the entire table result for a query that the user may discard. Another benefit to the execute—fetch command arrangement is that query table results which are larger than the storage capacity of the client 112, 114, 116 may be processed by the client a portion at a time.

Because the details of the execute and fetch commands may be cumbersome to a user, application software in each client 112, 114, 116 handles building the execute and fetch commands in response to indications made by the user to the user interface of the application software in the client 112, 114, 116. It is possible for the application software to manage the fetching process in a manner that is transparent to the user. The user believes that all of the table result is available in the client 112, 114, 116 and is unaware of the actual location of the query table result being displayed.

While the execute—fetch system provides some of the benefits described above to the clients 112, 114, 116, it can impose significant drawbacks on the server 110. The overhead required for the server 110 to perform each of the many fetches which may be required can be significant. The retrieval of the result from the storage device 102, which may be one or more conventional hard disks, requires heads to be repositioned to the proper sector, a relatively time consuming task. While disk caching systems can alleviate some of the head repositioning delay, if hundreds of users will access data relatively infrequently, the benefits from disk caching may be reduced unless the cache is relatively large, increasing its cost. Furthermore, even with a caching mechanism, the processor in the server 110 must still receive and process the fetch request for data. This processing can be substantial. For example, the processing can require the operating system to schedule the process that needs to process the call and this overhead can be quite high. Then, one or more subroutines must be called, which slow the processors in the server 110 from servicing the other clients 112, 114, 116 which share the server 110. Thus, receiving and processing fetch requests can require substantial processing overhead and this overhead may substantially exceed the amount of processing power required to fetch the data requested. If many small fetch requests are received, the response time of the server can be degraded.

In addition, in a client server system that allows session switching similar to that described in application Ser. No. 08/872,529, U.S. Pat. No. 8,243,751 or Ser. No. 08/873,057, U.S. Pat. No. 6,088,778, the overhead required to process a fetch command is further increased in order to switch the session. It is therefore desirable to reduce the number of commands that request data from the server 110.

Error and status information about the data transmitted from the servers 110 to the clients 112, 114, 116 is generated by the server 110 to describe the data and any error conditions that may occur. It is desirable to provide this information to the clients 112, 114,116 without requiring processing resources of the server 110

In addition, the cursor and evaluation tree may occupy memory in the server 110 that is not released until the server 110 has transmitted to the client 112, 114, 116 the entire table result requested by such client 112, 114, 116 or the user of the client 112, 114, 116 otherwise directs the server to release the area of memory for the cursor, for example by logging out or by indicating that no more results are desired. If the only mechanism the server 110 has to identify that the entire table result has been returned is to identify when a request is received to return to the client 112, 114, 116 a row past the end of the table 210, it is possible that such a request may never be made, causing the cursor to occupy memory in the server 110 well past the time the user will use the cursor and evaluation tree, until the user logs out or otherwise directs the server to discard the cursor and evaluation tree.

The use of memory in the server 110 for the cursor and evaluation tree can prevent the memory from being used to support other users or potential users of the server 110, slowing the response time of the server 110 or preventing its use by other potential users. Thus it is desirable to cause the memory reserved for the cursor and evaluation tree to be released as quickly as possible.

SUMMARY OF INVENTION

In accordance with the present invention, a server can provide more data than is requested by the application software in the client. The additional data may be stored by the client or other device external to the server in a storage device that may not be fully utilized. The additional data is made available to the client for use in place of a subsequent fetch command by the client to the server, thereby reducing the number of fetch commands sent over the network to the server if a subsequent fetch command may instead be fulfilled from the additional data previously sent, reducing network traffic and the need for the server to process commands as "roundtrips". Because the server does not have to process as many commands from each client, the same configuration server can perform substantially more work. Because the server provides more data than requested by the application software in the client, subsequent data requests are fulfilled sooner and the server memory used for the cursor and evaluation tree is thereby released sooner for use by other server functions. Because error and status information about the result may be generated by the client, server processing resources required are reduced and network traffic between the server and clients is reduced. The present invention can therefore significantly improve response time in a client-server or other similar architecture.

For example, many personal computers operate as a client in a client-server system, with large amounts of memory that may only be partially utilized by the operating system and application software running on the personal computer. This memory can be used as described herein to enhance the performance of the client-server system without any increase in cost. Similarly, processing resources in the client may not otherwise be fully utilized, and these processing resources can offload some of the processing that would otherwise be performed by the server.

BRIEF DESCRIPTION OF THE DRAWINGS

FIG. 2 is a block diagram of data arranged in rows and columns of a table.

DETAILED DESCRIPTION OF A PREFERRED EMBODIMENT

In one embodiment, the present invention is implemented as computer software running on conventional computer systems, with one or more systems acting as one or more servers and one or more systems acting as one or more clients, although other implementations may be used. Although the term "module" is used throughout, a module need not be implemented as computer software in a single unit, rather the functions of a module may be dispersed throughout many portions of computer software.

Figure 3:
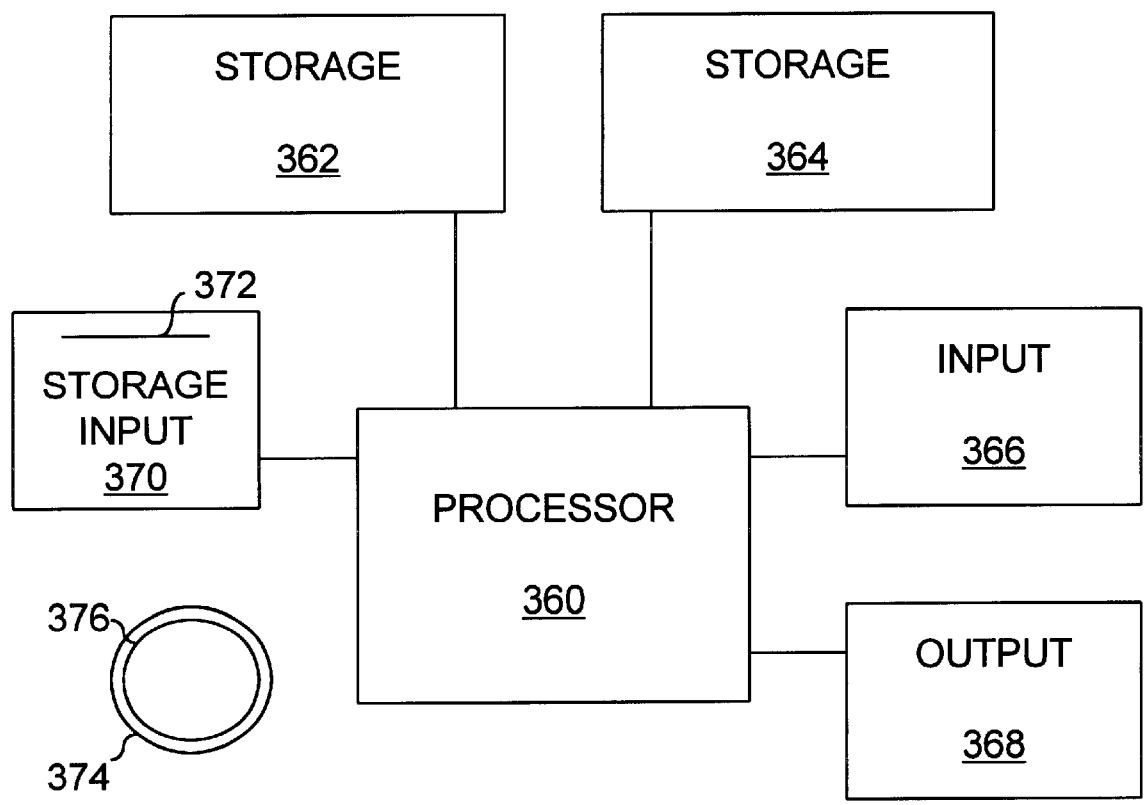
FIG. 3 is a block schematic diagram of a conventional computer system.

Referring now to FIG. 3, a conventional computer system 350 for practicing the present invention is shown. Processor 360 retrieves and executes software instructions stored in storage 362 such as memory which may be Random Access Memory (RAM) and may control other components to perform the present invention. Storage 362 may be used to store program instructions or data or both. Storage 364, such as a computer disk drive or other nonvolatile storage, may provide storage of data or program instructions. In one embodiment, storage 364 provides longer term storage of instructions and data, with storage 362 providing storage for data or instructions that may only be required for a shorter time than that of storage 364. Input device 366 such as a computer keyboard or mouse or both allows user input to the system 350. Output 368, such as a display or printer, allows the system to provide information such as instructions, data or other information to the user of the system 350. Storage input device 370 such as a conventional floppy disk drive or CD-ROM drive accepts via input 372 computer program products 374 such as a conventional floppy disk or CD-ROM that may be used to transport computer instructions or data to the system 350. Computer program product 374 has encoded thereon computer readable program code devices 376, such as magnetic charges in the case of a floppy disk or optical encodings in the case of a CD-ROM which are encoded to configure the computer system 350 to operate as described below.

Figure 1:
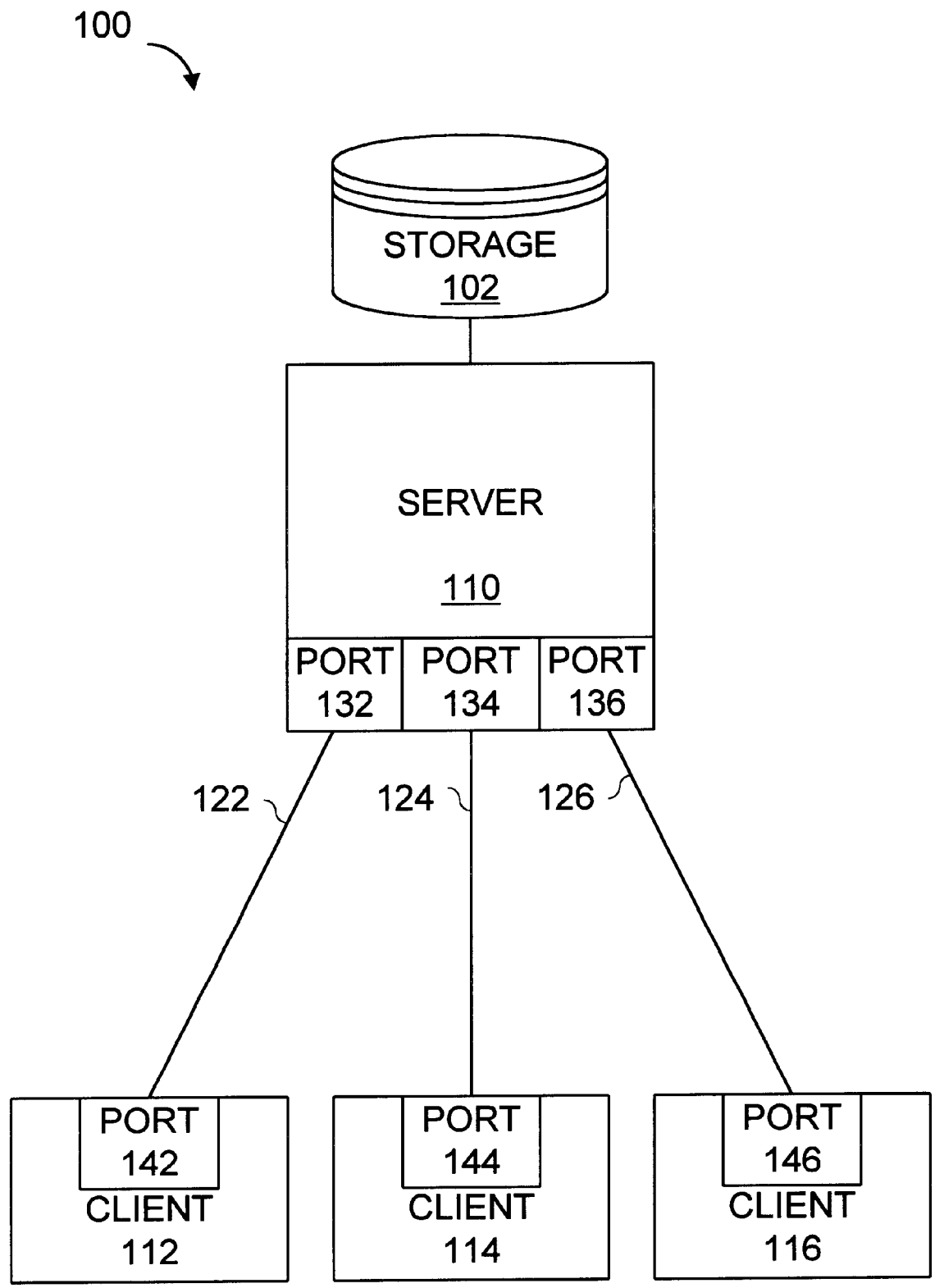
FIG. 1 is a block schematic diagram of four computers and a storage device coupled in a client-server architecture according to the prior art.

Referring now to FIGS. 1 and 3, in one embodiment, each system 350 for the clients 112, 114, 116 is a conventional IBM compatible computer running the Microsoft Windows NT operating system, and the system 350 for the server 110 is a conventional Sun Microsystems Ultra 1 Creator computer running the Solaris 2.5.1 operating system commercially available from Sun Microsystems of Mountain View, Calif., although other systems may be used. In another embodiment, the present invention is implemented in part in a conventional TP monitor. In another embodiment, the present invention is implemented in part in the resource manager disclosed in copending application Ser. Nos. 08/872,529, U.S. Pat. No. 6,243,751 and 08/873,057, U.S. Pat. No. 6,088,728, filed concurrently herewith.

Figure 4:
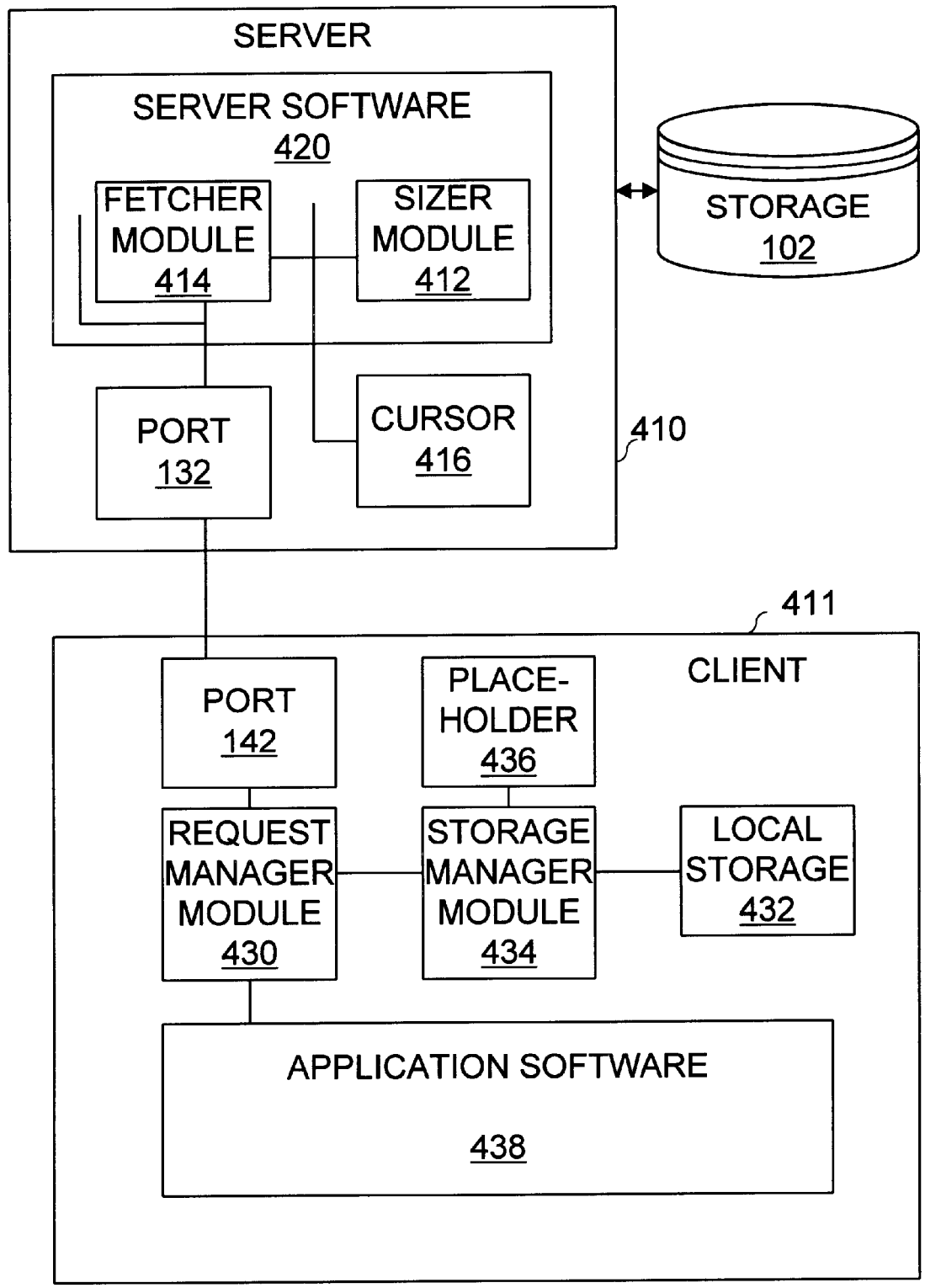
FIG. 4 is a block schematic diagram of a client and server according to one embodiment of the present invention.

Referring now to FIG. 4, a client 411 and a server 410 according to one embodiment of the present invention is shown. Client 411 and server 410 operate similarly to any of the conventional clients 112, 114 or 116 and the server 110 shown in FIG. 1 with the differences noted below. Conventional application software 438 such as Oracle Forms, a part of the Oracle 7 product commercially available from Oracle Corporation in Redwood Shores, Calif. in the client 411 interacts with the user to request the server 410 provide desired data from the storage device 102.

Server requests such as queries or fetches which are similar to conventional query or fetch commands that ordinarily would be sent to a server with the exception of optional size parameters described below are sent by the application software 438 of the client 411 in the direction of the server 410 via request manager module 430, which intercepts the request from the application software 438. If the request is other than a query or fetch or other similar request to retrieve data from the server 410, it is passed through to the server 410 by the request manager module 430.

If the request is a query, request manager module 430 builds an "execute" command using the request data and query information it receives and passes it to the server 410.

In one embodiment, the request received from the application software 438 contains as a parameter the number of desired rows of any result produced by the command. In addition, the request can identify a size of the local storage 432 which will be used to store results received. In one embodiment, the size of the local storage is specified by including two parameters with the request. The first of these parameters contains a numeric size and the second of these parameters contains a type. The type parameter specifies the units of measure for the size parameter, either rows or bytes, although any other measures may be used.

The request manager 430 builds a command to pass to the server 110 using the request received from the application software 438. The command built has size and type parameter that specify the size of the result to be returned. The size parameter specifies a number and the type parameter identifies the units of measure of the size parameter specified as either rows or bytes. In one embodiment, request manager module 430 builds a command having the same type parameter as the type parameter of the request it receives from the application software 438, and if no type parameter is specified, the command is built with a type parameter indicating that the size parameter specifies a number of rows. The size parameter is calculated as described below to produce a maximum size result, a result that makes the fullest possible use of the local storage 432. Request manager module 430 then sends the command to the server 410 via ports 142, 132. The command tells the server 410 to execute the query and to return the result corresponding to the size and type parameter of the command.

If the type parameter in the command received by the server 410 indicates that the size parameter specifies a number of rows, fetcher module 414 returns up to the number of rows of the table result specified in the command, or the entire table, whichever is smaller. If the type parameter indicates that the size parameter specifies a number of bytes, fetcher module 414 requests sizer module 412 to compute the greatest number of rows that will fit into the number of bytes specified in the size parameter, and sizer module passes the number of rows to fetcher module 414 which fetches from the storage device 102 the number of rows specified or the entire table, whichever is smaller, and transmits them to request manager module 430.

Request manager module 430 receives the response from fetcher module 414, passes the response, as well as additional information including the number of rows received, the number of rows requested and the description of the number of bytes per row calculated as described below to the storage manager module 434. The additional information may be returned by the fetcher module 414 as part of the response, or generated by the request manager module 430. Storage manager module 434 stores the response in local storage 432, and maintains the additional information. Request manager module 430 passes the desired number of rows originally requested by the application software 438 to the application software 438.

In one embodiment, the rows originally requested are passed to the application software 438 as they are received by request manager module 430 from fetcher module 414 and only the remainder of the response is stored in local storage 432. In another embodiment, request manager module 430 passes to the application software 438 the rows originally requested and stores the entire response in local storage 432 via the storage manager module 434. In another embodiment, the response is first stored in local storage 432 and then the rows originally requested by the application software 430 are retrieved from local storage 432 by request manager module 430 forwarding a portion or all of the original request to storage manager module 434 which processes the request and provides the rows to request manager module 430 which forwards them to the application software 438.

In one embodiment, storage manager module 434 maintains a placeholder 436 pointing to the row past the number of rows provided to the application software 438 so that subsequent fetch commands can be filled starting at the row indicated by the placeholder 436.

As described above, the command sent by the request manager module 430 directs the server 411 to return the maximum size result. The maximum size result is a result that makes maximum use of the local storage 432 based on the operation of the client 411 and the request received by the request manager 430 from the application software. If the two parameters specifying the size of local storage and type of units were not included in the request by the application software 438, request manager module 430 builds a command with a size parameter one greater than the desired number of rows and a type parameter indicating the size parameter specifies a number of rows, and this specifies the maximum size result. In servers 410 in which the memory holding the evaluation tree corresponding to the cursor 416 is released only if a command is received which requests rows beyond the end of the table result, the additional row in the command that was not specified in the request can cause the memory for the cursor 416 to be released by the server 410 earlier than if the desired number of rows had been used.

If a type parameter in the request received indicates that the size parameter specifies a number of bytes, the two parameters received from application software 438 as part of the request are used as parameters by request manager module 430 to build the command that is sent to the server 410, and these parameters specify the maximum size result.

If a type parameter in the request received indicates that the size parameter specifies a number of rows, the request manager module builds a command with the same type parameter. The size parameter corresponding to the maximum size result depends on the operation of the request manager module 430. If the rows received by the client 411 are passed by request manager module 430 to the application software without storing them in the local storage 432, the maximum size result is the number of rows in the request received plus the number of number of rows specified in the local storage 432 in the request. Otherwise, the maximum size result is the size of the local storage 432 specified in the request.

In one embodiment, if a new query is performed, the process above is repeated and the table result stored from the previous query is overwritten in local storage 432 or a new area of local storage 432 is created for use by the query. Alternatively, if the application software 438 transmits a fetch request to request manager module 430 to receive more of the result requested from a prior execute command, the fetch request also contains a desired number of rows, and may contain the size and type parameters that define the size of the local storage 432. Request manager module 430 queries storage manager module 434 to determine if the desired number of rows in the fetch request are in local storage 432. Because the execute and fetch commands sent to the server 410 can specify more rows than are requested by the application software 438, some subsequent fetch requests can be filled entirely from local storage 432, eliminating the overhead on the server 410 associated with processing the added fetch command which would otherwise be required.

If the fetch request can be satisfied from the data in local storage 432, storage manager module 434 so informs request manager module 430, and the desired number of rows requested, or the remainder of the table, whichever is smaller, starting at the row indicated by the placeholder 436, are passed from local storage 432 to the application software 438 via storage manager module 434 and request manager module 430. The placeholder 436 is updated by storage manager module 434 to reflect the position of the row in local storage 432 following the last row provided.

If the fetch request received by request manager module 430 from application software 432 cannot be entirely filled from local storage 432, request manager module 430 transmits a request to storage manager module 434 to transmit the remaining contents of the local storage 432 and request manager module 430 provides the contents to the application software 438.

Request manager module 430 then obtains additional rows from the server 410. Request manager module 430 builds a fetch command and transmits the command to the server 410 via ports 142, 132. The command is built to retrieve the maximum size result as described above with reference to the execute command, with the exception as noted below.

If the type parameter in the command received by the server 410 specifies a number of rows, the number of rows in the size parameter or the number of rows remaining in the table result, whichever is smaller, is retrieved using the cursor 416 by the fetcher module 414 beginning at the row past the last row most recently fetched by the fetcher module 414 and passed to the request manager module 430. If the type parameter specifies a number of bytes, the size parameter is passed to sizer module 412 which computes the maximum number of rows that will fit into the number of bytes in the size parameter, passes the number of rows to the fetcher module 414, and fetcher module 414 retrieves that number of rows, or the remainder of the table, whichever is smaller, using the cursor 416 and transmits them via ports 132, 142 to the request manager module 430.

When the rows are received by request manager module 430, it passes them to storage manager module 434 which stores them in local storage 432 and sets the placeholder 436 to point to the top of the local storage 432. Request manager module 430 instructs the storage manager module 434 to retrieve the remaining number of rows required to fulfill the fetch request, and passes the results to application software 438. In one embodiment, storage manager module 434 is coupled (not shown) to application software and provides all results to application software without sending them via request manager module 430.

In an alternate embodiment of the present invention, the rows received from the server 411 that are sent to the application software 438 to complete the request that triggered the building and sending of the command are not initially stored in local storage, but passed directly to the application software 438 by the request manager module 430. In such embodiment, if the fetch or execute requests received from the application software 438 specify a type parameter designating the size parameter as a number of rows, the number of rows specified in the command to achieve he maximum size result is equal to the desired number of rows plus the size parameter specified less the number of rows passed to the application software 438 from local storage 432.

As described above, some commands sent by request manager module 430 contain a size in number of bytes and a type parameter indicating the units of the size parameter are bytes. In this case, server 410 computes the maximum number of rows that will fit into the number of bytes specified, and returns that number of rows. In one embodiment, sizer module 412 can identify the size of each row using conventional data type definitions passed to the server 410 by the application software 438. In one embodiment, data type definitions are obtained from a data dictionary portion of memory or other storage in the server 410. Sample data type definitions for table 210 of FIG. 2 are as follows:

```
create table employee (
    emp_first      varchar2(40)
    emp_last       varchar2(40)
    emp_sex        char(1)
    emp_dept       varchar(20)   );
``` where each type defined as varchar(n) is a null terminated string of one byte per character with a maximum length of n bytes, and type char(n) is a fixed length string of length n with one byte per character. Sizer module 412 traverses the variable length strings and the fixed length strings pointed to by the evaluation tree corresponding to the cursor 416, summing the bytes in each, and incrementing a row counter when an end of the row is reached. When the number of bytes specified in the size parameter is reached, the number of rows in the row counter is returned by sizer module 412 to fetcher module 414 so that it can fetch that many rows from the storage device 102.

In one embodiment, sizer module 412 returns the size in bytes of each row as a part of the result produced, and the sizes are returned to request manager module 430 and storage manager module 434 for use in determining the size of each row. In another embodiment, the rows are returned in such a manner that the start of each row can be identified. In an alternate embodiment, the definitions are also maintained by storage manager module 434 which performs the same functions as sizer module 412 with respect to the data stored in local storage 432 to retrieve data from local storage 432 to identify the row boundaries so that the desired number of rows may be returned.

The functions of the request manager module 430, storage manager module 434, local storage 432 and placeholder 436 may be provided as application programming interfaces in any of the clients 112, 114, 116 of FIG. 1. Alternatively some or all of these functions may be placed on a conventional TP monitor, or any other device external to the server 410 such as a resource manager described in copending application Ser. Nos. 08/872,529, U.S. Pat. No. 6,243,751, and 08/873, 057, U.S. Pat. No. 6,088,778. In another embodiment, the functions are split between several devices, which may include any two or more of a client, server, resource manager, TP monitor or other device external to the server 410.

In another embodiment of the present invention, instead of a type parameter and a size parameter, a row count parameter and a byte count parameter are used. Requests that cannot be filled using local storage 432 as described above are translated into commands using one or both of these parameters. In one embodiment, the request specifies both parameters to use in the command in the event that the request cannot be filled from local storage 432. In another embodiment, a separate request is sent by application software 438 to request manager module 430 that specifies the size of one or both parameters that all commands will use until changed, and if only one parameter is so specified, the other parameter is provided in each request. If one or both parameters are omitted from the request, request manager module will use the value in the previous request.

In another embodiment, the value of one or more of the row count or byte count parameters received from the application software 438 are the only values transmitted to server 410. When request manager builds and sends a command, if the row count parameter is passed without the byte count parameter, the number of rows specified by the row count parameter are returned as described above. If the byte count parameter is passed without the row parameter, the number of rows that fit onto that many bytes is computed and returned as described above.

If both parameters are passed in the command from the request manager module 430 to fetcher module 414, the byte count is used and the row count is ignored in one embodiment and the maximum number of rows that will fit into the number of bytes specified are calculated and returned as described above. In another embodiment, if both parameters are passed in the command the number of rows that will fit into the number of bytes specified are calculated, and the smaller of that number or the number of rows specified in the row count parameter are returned.

If neither of the row count row byte count parameters are specified, only the rows requested by the fetch command are returned by server 410 in one embodiment, and one additional row is returned by server 410 in another embodiment. In servers that release the cursor to a table when the row following the last row of the table has been requested, sending one additional row can cause the cursor to be released if the fetch would have otherwise requested the number of rows remaining in the table.

In one embodiment, status and error information about the data that is provided by the request manager module 430 to the application software 438 may be generated by the request manager module 438 instead of the server 410, and passed to the application software 438, reducing the amount of processing required by the server 410 and reducing network traffic between the client 411 and the server 410. This status and error information can include the size information, such as the size of each row or the size of the result, and whether a requested row or data field in a requested row exists. Request manager module 430 scans the data as it is being provided to application software 438 and generates and provides the status and error information to application software 438 following the transmission of the requested rows.

Figure 5:
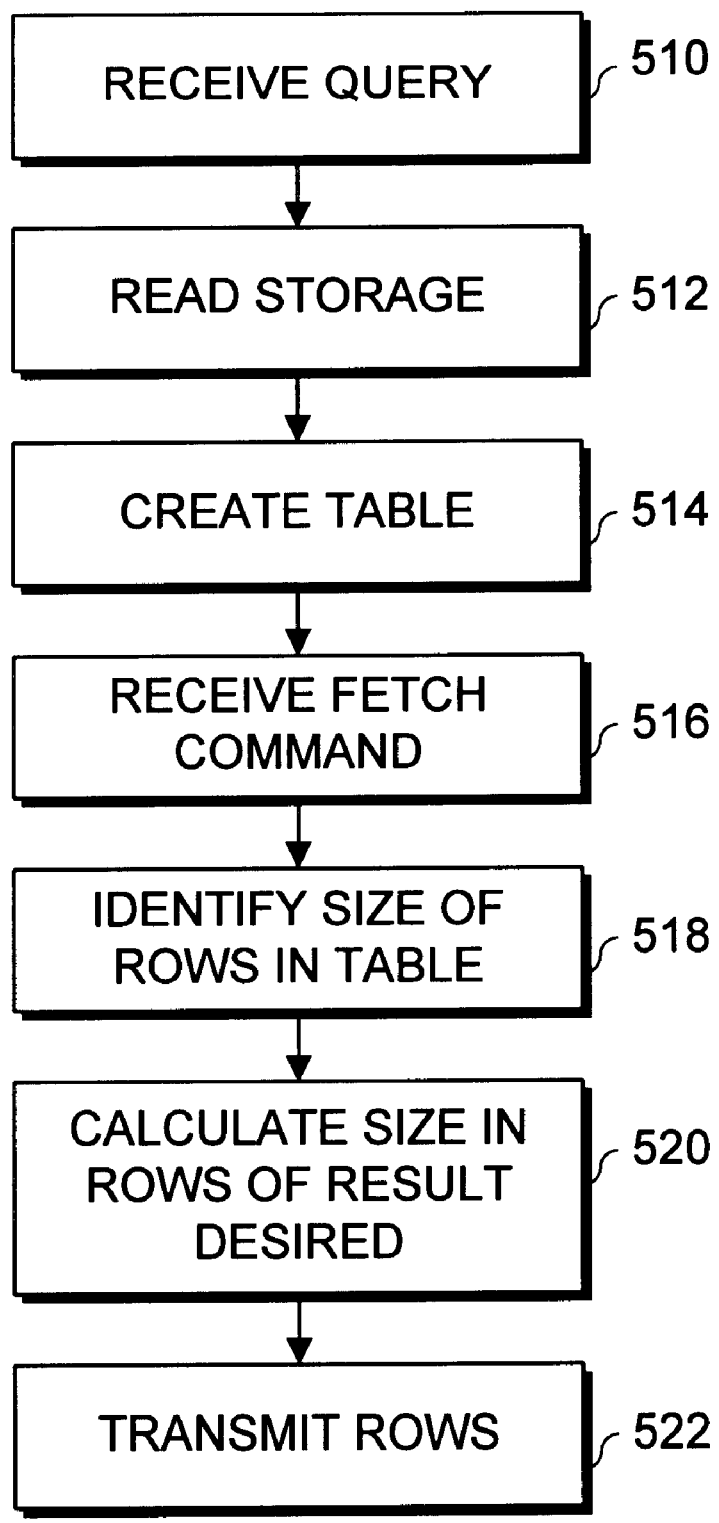
FIG. 5 is a flowchart illustrating a method of providing data from a server according to one embodiment of the present invention.

Referring now to FIG. 5, a method of providing data from storage according to one embodiment of the present invention is shown. A query or other command describing or identifying desired data is received 510. The storage is read to locate and retrieve the desired data 512, and a table of desired data is created 514. The creation of the table may include storing pointers to the data in the table in a device such as memory or hard disk. A command to transmit a portion of the data in the table is received 516. In one embodiment, the command is a fetch command. In another embodiment, the fetch command is implicit in another command such as a query execute command received in step 510. In another embodiment, either type of command may be used.

In one embodiment, the fetch or other command received in step 516 contains a size of the portion of the table to be transmitted. In one embodiment, the size is a number of rows, and this number of rows or the remainder of the table not previously transmitted is transmitted 522 beginning at the row following the last row previously transmitted. In one embodiment, the size is a number of bytes, and the size in bytes of each row in the table is computed 518, and the approximate number of rows that will fit into size of bytes desired is calculated 520 and that many rows are, or the remainder of the table not previously transmitted is, transmitted 522 beginning at the row following the last row previously transmitted. In one embodiment the approximate number of rows is the greatest number of rows that does not exceed the number of bytes desired. In another embodiment, the approximate number of rows is one greater than such number. Other sizes may be communicated in the commands of steps 510 and/or 516.

In one embodiment, the row count and byte count parameters are used as described above to calculate the size of the result desired as described above.

In one embodiment, other commands may be used to set the starting point for the rows to be transmitted at a position other than the row following the row most recently transmitted.

Figure 6:
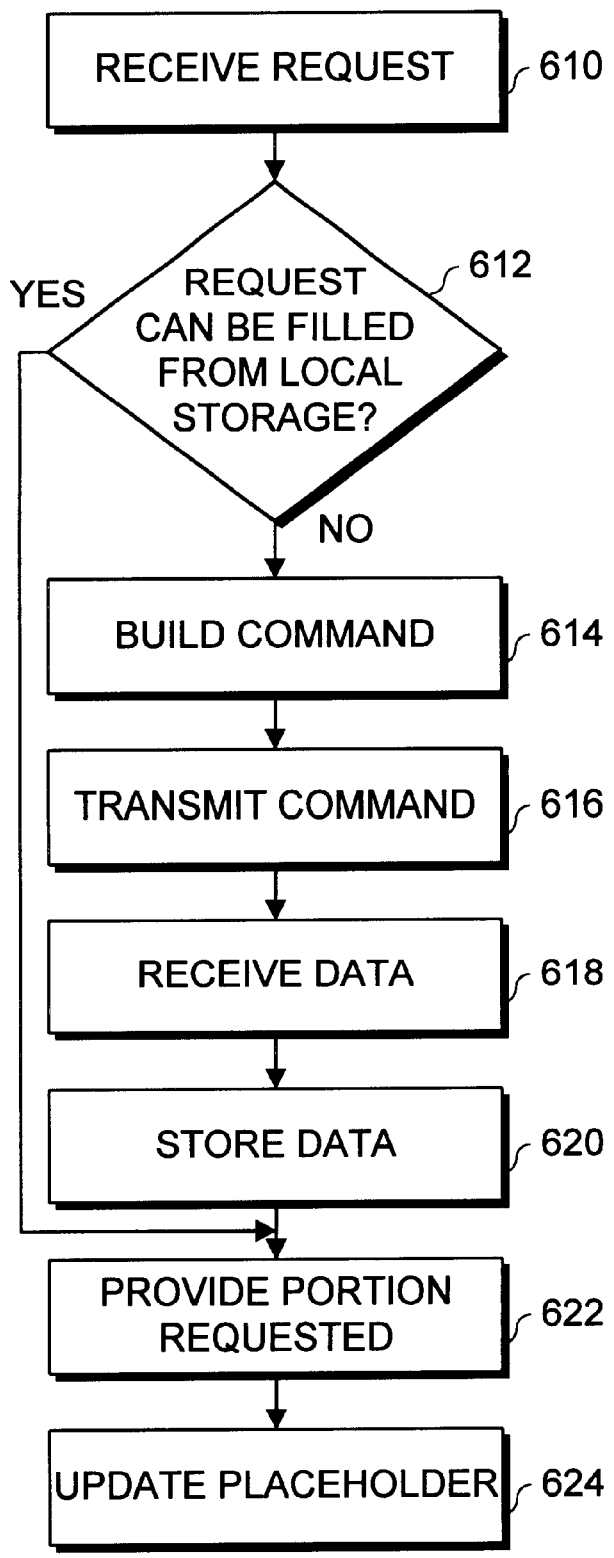
FIG. 6 is a flowchart illustrating a method of providing server data according to one embodiment of the present invention.

Referring now to FIG. 6, a method of retrieving a requested portion of data according to one embodiment of the present invention is shown. A request describing the portion of data to be retrieved is received 610, and local storage or a description of local storage is consulted to determine whether the request may be filled from local storage 612. If the request can be filled from local storage, the requested portion is retrieved from local storage and provided 622. If the request cannot be filled from local storage, a command for data is built 614 and transmitted 616. In one embodiment, the command is made of two or more subcommands, which may be sent together or separately.

In one embodiment, the command is built to specify more or less than the data specified in the request received in step 610. In one embodiment, the request received in 610 contains a requested number of rows and the command built specifies a number of rows that is one greater than the requested number of rows. In one embodiment, the request received in step 610 may define a size of a local storage in rows and the command built in step 614 specifies the number of rows requested plus the size in rows of the local storage less any rows that are in local storage at the time the request is received in step 610 that are used to supply the requested number of rows. In another embodiment, the request contains a number of bytes and the command built specifies the number of bytes in the request.

The data specified in the command is received 618 and some or all of the data is stored 620. In one embodiment, the storage is in a device such as a memory or hard disk. The portion requested is provided 622, in one embodiment by providing it from the data received in step 618, providing it from the data stored before the storage step 620, providing it from data stored after the storage step 620 or in any combination of these. In such embodiments, some of the data provided in step 622 may be provided from the local storage prior to step 618 with the remainder provided after step 618. In one embodiment, the providing step 622 includes generating and providing the status and error information as described above.

In one embodiment, a placeholder indicating a starting position in the data received of data not provided in step 622 is updated 624, and the placeholder is used to identify whether the request can be filled from local storage in step 612. In such embodiment, the number of rows of data stored is maintained, and the placeholder indicates a row number corresponding to the first row of data not provided in step 622. The placeholder is subtracted from the number of rows stored, and if the result is greater than the number of rows of data received in the request, the request can be filled from local storage. In one embodiment, some requests, such as a request to execute a new query, are not filled from local storage, and step 612 results in the "NO" branch for such commands.

What is claimed is:

1. An apparatus for providing data from a server, comprising:
   a request manager module remote from the server and coupled to the server for receiving a request describing data and preparing and transmitting to the server a command, different from the request, requesting an amount of data different from the data described in the request;
   a local storage remote from the server and coupled to the server for receiving data from the server; and
   wherein the command prepared and transmitted by the request manager module is for the data described in the request and additional data.

2. The apparatus of claim 1 wherein the data described in the request and the additional data comprise a table.

3. The apparatus of claim 1 wherein the command comprises a size.

4. The apparatus of claim 3 wherein the size comprises a number formed by adding numbers selected from a number of rows of the local storage, a number of rows in the request and a constant number, and subtracting a number of rows of the requested data in the local storage.

5. The apparatus of claim 3 wherein the size comprises a number of bytes corresponding to a number of bytes in the request.

6. The apparatus of claim 1 wherein the command comprises a command selected from at least one of a fetch command and an execute command.

7. The apparatus of claim 1 additionally comprising:
   a storage manager module coupled to the local storage and the request manager module for signaling whether at least a portion of the data described in the request is stored in the local storage; and
   wherein the request manager module is coupled to the storage manager module and is additionally for providing from the local storage at least a portion of the data requested responsive to the storage manager module signal.

8. The apparatus of claim 7 additionally comprising a placeholder coupled to the storage manager module for identifying a first set of the data described in the request and stored in the local storage.

9. The apparatus of claim 1 wherein the request describing data comprises an explicit, numerical quantity of the data.

10. A method of providing data from a server, comprising:
    receiving a command to provide data from a table comprising rows, the command comprising at least one size different from a first number of rows;
    calculating a whole number of the rows of the table corresponding to at least one of the at least one size different from the number of rows of the command received wherein a size of the whole number of rows is different from the at least one size different from the first number of rows and wherein the command specifies a second number of rows greater than the whole number of rows; and transmitting the data to a device external to the server the data having a third number of rows equal to the whole number of rows of the data calculated.

11. The method of claim 10, comprising the additional steps of:

receiving a query command;

reading a storage to identify data corresponding to the command received; and building the table from the data identified.

12. A method of providing a set of data, comprising:

receiving a request for at least a portion of data in the set, the request specifying an amount of the data;

responsive to the request received, transmitting a command, different from the request, to a remote server for an amount of data different from the amount specified by the request; and wherein the command is for the data described in the request and additional data.

13. The method of claim 12, additionally comprising the steps of:

identifying the existence in a local data storage of at least a portion of the data in the set;

responsive to at least a portion of the data in the set in the local data storage, providing at least a portion of the data in the set from the local storage; and wherein the transmitting step is responsive to at least a portion of the data in the set not in the local data storage.

14. The method of claim 13 wherein the request is received from an application software remote from the server; and the application software and local data storage are located in the same device.

15. The method of claim 13, comprising the additional step of receiving data corresponding to the data in the command transmitted to the server.

16. The method of claim 13 wherein the command transmitted is selected from at least one of an execute command and a fetch command.

17. The method of claim 12 wherein the request comprises an explicit numerical quantity of the data.

18. A computer program product comprising a computer useable medium having computer readable program code embodied therein for providing data from a server, the computer program product comprising:

computer readable program code devices configured to cause a computer to receive a command to provide data from a table comprising rows, the command comprising at least one size different from a first number of rows;

computer readable program code devices configured to cause a computer to calculate a whole number of the rows of the table corresponding to at least one of the at least one size different from the number of rows of the command wherein a size of the whole number of rows is different from the at least one size different from the first number of rows and wherein the command specifies a second number of rows greater than the whole number of rows; and computer readable program code devices configured to cause a computer to transmit the data to a device external to the server the data having a third number of rows equal to the whole number of rows of the data calculated.

19. The computer program product of claim 18 additionally comprising:

computer readable program code devices configured to cause a computer to receive a query command;

computer readable program code devices configured to cause a computer to read a storage to identify data corresponding to the command received; and computer readable program code devices configured to cause a computer to build the table from the data identified.

20. A method of providing a set of data, comprising:

receiving a request for at least a portion of data in the set, the request specifying an amount of the data;

responsive to the request received, transmitting a command, different from the request to a remote server for an amount of data different from the amount specified by the request; and wherein the command is for the data described in the request and additional data.

21. The computer program product of claim 20 additionally comprising:

computer readable program code devices configured to cause a computer to identify the existence in a local data storage of at least a portion of the data in the set;

computer readable program code devices configured to cause a computer to provide at least a portion of the data in the set from local storage responsive to at least a portion of the data in the set in the local storage; and wherein the computer readable program code devices configured to cause a computer to transmit are responsive to at least a portion of the data in the set not in the local data storage.

22. The computer program product of claim 21 wherein the request is received from an application software remote from the server; and the application software and local data storage are located in the same device.

23. The computer program product of claim 22, additionally comprising computer readable program code devices configured to cause a computer to receive data corresponding to the data in the command transmitted to the server.

24. The computer program product of claim 21 wherein the command transmitted is selected from at least one of an execute command and a fetch command.

25. The computer program product of claim 20 wherein the request comprises an explicit numerical quantity of the data.

* * * * *

UNITED STATES PATENT AND TRADEMARK OFFICE
CERTIFICATE OF CORRECTION

PATENT NO. : 6,421,715 B1  Page 1 of 1
DATED : July 16, 2002
INVENTOR(S) : Debashish Chatterjee et al.

It is certified that error appears in the above-identified patent and that said Letters Patent is hereby corrected as shown below:

<u>Column 14,</u>
Lines 23-31, replace claim 20 with the following:

20. A computer program product comprising a computer useable medium having computer readable program code embodied therein for providing a set of data, the computer program product comprising:
 computer readable program code devices configured to cause a computer to receive a request for at least a portion of data in the set, the request specifying an amount of the data;
 computer readable program code devices configured to cause a computer to, responsive to the request received, transmit a command, different from the request, to a remotely-located server for a different amount of data than is specified by the request; and
 wherein the command is for the data described in the request and additional data.

Signed and Sealed this

Twenty-fifth Day of March, 2003

JAMES E. ROGAN
*Director of the United States Patent and Trademark Office*